United States Patent
Lin et al.

[11] Patent Number: 6,083,377
[45] Date of Patent: Jul. 4, 2000

[54] ELECTROCHEMICAL TREATMENT OF WATER CONTAMINATED WITH NITROGENOUS COMPOUNDS

[75] Inventors: Mei Lin; Gene S Shelp, both of Guelph; Ward Chesworth, Eden Mills, all of Canada

[73] Assignee: ENPAR Technologies Inc., Guelph, Canada

[21] Appl. No.: 09/125,863

[22] PCT Filed: Feb. 21, 1997

[86] PCT No.: PCT/CA97/00122

§ 371 Date: Aug. 17, 1998

§ 102(e) Date: Aug. 17, 1998

[87] PCT Pub. No.: WO97/30941

PCT Pub. Date: Aug. 28, 1997

[30] Foreign Application Priority Data

Feb. 22, 1996 [GB] United Kingdom .................. 9603741

[51] Int. Cl.$^7$ ........................................... C02F 1/461
[52] U.S. Cl. ..................... 205/617; 205/688; 205/742; 205/743; 205/745; 205/761
[58] Field of Search .................................. 205/617, 688, 205/742, 743, 745, 761

[56] References Cited

U.S. PATENT DOCUMENTS

5,565,107 10/1996 Campen et al. ........................ 205/688
5,614,078 3/1997 Lubin et al. ............................ 205/743

*Primary Examiner*—Arun S Phasge
*Attorney, Agent, or Firm*—Anthony Asquith & Co.

[57] ABSTRACT

Waters contaminated by nitrogenous compounds such as nitrate, ammonium, etc., are treated by electrochemical transformation of the contaminant to nitrogen gas. Electrodes are placed in the contaminated water to form a cell, in which the voltage of one of the electrodes is set to the Eh voltage at which nitrogen gas is thermodynamically favored. The cell may be electrolytic or galvanic.

19 Claims, 5 Drawing Sheets

ELECTROCHEMICAL TREATMENT OF WATER CONTAMINATED WITH NITROGENOUS COMPOUNDS

This application is a 371 of PCT/CA97/00122 filed Feb. 21, 1997.

This invention relates to the treatment of polluted or contaminated water by electrochemical treatment (which includes both galvanic and electrolytic treatment). The invention is intended to be applied to waters contaminated by dissolved nitrogenous compounds.

In conventional cases where electrolysis has been used for treating contaminated water, the reactions that have been utilised have been those, for example, which take metals out of solution by cathode deposition.

Work has been done on the use of electrolysis for treating effluent from manufacturing establishments, where the water is polluted with a specific pollutant. But those systems were special in that the effluent water was already contained, and the research effort was directed to cleaning up or recovering specific contaminants, at known concentrations, and in a system that was designed to cater for the pollutant when the factory was built.

Ammonium ($NH_4^+$) in sewage water can be broken down by bacterial action. Much consideration and effort has been applied over many years to engineering the ammonium breakdown reaction on a large scale, in the context of municipal sewage water treatment. Generally, bacteria promote oxidation of the ammonium into nitrate; other bacteria then promote denitrification or reduction of the nitrate to nitrogen gas. The reaction has been engineered by providing an environment in which bacteria can effect the oxidation and reduction.

Some shortcomings of this conventional procedure will now be discussed. The biological oxidation of ammonium to nitrate and the subsequent reduction of the nitrate to nitrogen gas, has undesirable side-effects. Other compounds of nitrogen are formed, such as nitric oxide (NO), nitrous oxide ($N_2O$), and nitrogen dioxide ($NO_2$), which are considered to be either directly toxic to humans and other animals, or harmful to the ozone layer or other aspects of the environment.

One problem is that the conversion of ammonium to nitrogen, via nitrate, done microbiologically, as in the conventional systems, has been far from complete. Significant quantities of the nitrogen oxides can be released, as gases, during the reactions, in addition to the nitrogen gas. When, as in the conventional systems, the oxidation of ammonium /ammonia occurred biologically (nitrification), the reaction pathway may be described as:

whereby the harmful intermediate gaseous compounds may escape into the atmosphere.

Also, the nitrate produced by the ammonium breakdown cannot be left in the water. And nitrate itself, for example from agricultural run-off, may be present as a nitrogenous contaminant per se, in groundwater.

When the reduction of nitrate occurred biologically (denitrification), the reaction pathway may be described as:

Again, the intermediate gaseous compounds may escape.

Another point that should be noted is that the efficiency of the conventional biochemical nitrification and denitrification reactions is affected by cold weather, whereby it is found that the gases released to the atmosphere in the winter contain an even larger proportion of $N_2O$ and $NO_x$ gases. This is a marked disadvantage of the conventional systems. In some cases, also, the temperature can be so low that biological reactions substantially do not take place at all, and breakdown of the contaminants has to await warmer weather.

It is recognised that the electrochemical reactions as described herein have the potential to proceed at lower temperatures than the conventional biological processes. They may therefore be suitable for cold-climate applications, where biological remediation is ineffective for most of the year.

GENERAL FEATURES OF THE INVENTION

It is recognised in the invention that, in order to remove nitrogenous contamination, the nitrogenous contaminants can be transformed, by engineered electrochemical processes, directly into nitrogen gas. (Nitrogen gas of course already comprises 4/5 of the atmosphere, and its release is not harmful.)

It is also recognised that inorganic electrochemical reactions can be used to drive both kinds of breakdown reaction, i.e the oxidation of e.g ammonium, and the reduction of e.g nitrate, both to gaseous nitrogen directly, whereby the production and release of the harmful intermediate gaseous compounds is eliminated or reduced.

Electro-chemical treatment of water containing nitrogenous contaminants has been proposed (Lin & Wu, 1995 Jrnl. Env. Sci. & Health, A30, 1445–1456). What is not present in the prior art is the recognition that nitrogenous contaminants can be transformed, by commercially practicable electrochemical processes, directly into nitrogen gas, and thereby eliminated from the system.

In assessing whether a particular reaction will proceed electrolytically, the reaction may be compared to the Nernst equilibrium equation:

$$E = E_0 - (RT/nF)\log_e(Q)$$

in which E is the cell voltage, $E_o$ is the cell voltage of a standard cell (calculated, or derived from tables), Q is the concentration quotient, being the ratio of the mathematical product of the concentrations of all the reaction products, divided by the mathematical product of the concentrations of all the reactants. For example, at 25° C., the term (RT/nF) $\log_e(Q)$ can be evaluated as $(0.0592/n)\log_{10}(Q)$.

One aspect of the present invention lies in determining, from an assessment of the Nernst equation, whether electrolysis will be effective in a particular situation, to cause contaminants to break down, and if so to what, and under what treatment conditions.

The Nernst relationships for many different transformations and conditions may be plotted on a predominance field diagram, or phase diagram, or Pourbaix diagram, i.e a nitrogen-oxygen-hydrogen Eh-pH solution phase diagram. Such a diagram is published and available on a chemistry text book basis, as it relates to aqueous nitrogenous compounds. Sets of the Nernst relationships appropriate to the nitrogenous compounds are also available in table form, again on a text-book basis, and that may also be used.

In carrying out a preferred form of the invention, the designer of the system may use the Nernst relationships in a phase-diagram form, for example. The designer enters on the phase diagram the Eh and pH that are measured in the contaminated system. He then notes, from the diagram, the voltage V-Ngas at which, at the measured pH, the predominating form of nitrogen is nitrogen gas. A computation is made as to the voltage difference between V-Ngas and the voltage V-Eh as actually measured.

The designer then provides an electrochemical cell, having two electrodes (i.e an anode and a cathode). If the nitrogenous contaminant is one (e.g dissolved nitrate) which requires the addition of electrons in order to be transformed into gaseous nitrogen, then it can pick up the electrons it needs from the cathode, and the designer should arrange the cell so that the water flows by the cathode. The cell should be so arranged as to its size, and the velocity of movement of water therethrough, that the residence time of the water near the cathode is long enough for the transformation reaction to be substantially completed.

Similarly, if the nitrogenous contaminant is one (e.g dissolved ammonium) which requires the subtraction of electrons in order to be transformed into gaseous nitrogen, then it can shed the excess electrons to the anode, and the designer should arrange the cell so that the water flows by the anode. Again, the cell should be so arranged as to its size, and the velocity of movement of water therethrough, that the residence time of the water near the anode is long enough for the transformation reaction to be substantially completed.

In either case, the engineer should set the voltage V-cell which will be applied between the electrodes to a value at which the Eh voltage as measured in the vicinity of one of the electrodes, after the electrochemical reaction has been initiated, lies at a voltage level, V-Ngas, at which nitrogen gas predominates. That is to say, the engineer adjusts the electrical energy available at the electrodes to the effect that the Eh voltage near one of the electrodes changes from V-Eh as measured initially to a voltage that lies within the range of Eh voltages at which nitrogen gas predominates.

In either case, it may be noted, the other electrode basically serves no function in the transformation reaction. (On the other hand, as will be explained later, sometimes both the anode and the cathode of the same cell can be instrumental in releasing gaseous nitrogen.)

It should be noted that in cases where very reductive conditions prevail, the Eh voltage, V-Eh, as measured, may be negative.

As an example, in a particular case, a body of water contaminated with dissolved ammonium may be identified as having an Eh voltage of, say, −0.53 volts. The pH of the body may be measured at, say, 4.5. Given that the pH is not to be changed, the designer traces up the diagram, at a constant pH, until he comes to an Eh voltage at which the predominant phase of the nitrogen is nitrogen gas. It is found that nitrogen gas predominates over a range of Eh voltages at that pH, i.e from about 0.0 volts to about +0.3 volts. Given that range, the designer preferably should aim for an Eh voltage of +0.15 volts.

(It is assumed that the pH of the water is a given, and that nothing is to be done to change the pH. Sometimes, however, it is possible economically to change the pH, and in that case such changes can be factored into the computations—but it is a benefit of the system as described herein that usually the pH may be left at whatever value obtains naturally, and only the Eh voltage need be manipulated.)

In the exemplary case of water contaminated by ammonium at a pH of 4.5, the designer should aim to set up the cell so that the Eh voltage of the water in the region of the anode of the cell is about +0.15 volts. The engineer then adjusts the electro-chemical parameters (including the voltage applied between the electrodes) in order to produce the required Eh voltage V-Ngas near the anode—being a voltage between the limits V-Ngas-upper (0.3 volts) and V-Ngas-lower (0.0 volts). Preferably, the cell is engineered to provide an Eh voltage in the vicinity of the anode of +0.15 volts.

To achieve this, the Eh voltage near the cathode might go even more negative, i.e further away from promoting the gaseous phase of the nitrogen. But that does not matter: when the water passes near the anode, nitrogen gas will bubble off, and when the water passes the cathode, nitrogen gas will not bubble off. Only one of the electrodes—the anode in this case—is effective.

Preferably, it should be arranged that the water moves through the cell (or cells) in such a manner that all the contaminated water is caused to be close to the anode for an adequate residence time.

It will be understood that when the contaminant is nitrate, the cathode now becomes the electrode which is effective to transform the nitrogen into nitrogen gas. In an exemplary case, the Eh might be measured at +1.1 volts, and the pH at 9.0. Now, having carried out the Nernst calculations (or having inspected the phase diagram) the engineer knows to arrange the electrochemical characteristics of the cell so that the Eh voltage as measured in the vicinity of the cathode of the cell lies at about −0.1 volts, since that is a voltage at the middle of the range which, at a pH of 9.0, nitrogen gas is the predominant phase.

The cathode and anode of the cell might be physically the same. In fact, the polarity of the cell may be reversed periodically or cyclically. This can be useful for ensuring that all the water gets treated, and also, switching the electrodes might serve to prevent a build up of a coating on the anode, which sometimes is a problem.

In some cases, the Nernst equation indicates that the transformation to the nitrogen gas phase can take place galvanically, i.e without the input of electrical energy from an outside source, if the cell is engineered appropriately. In that case, the electrodes would be of different materials, the anode being the material that is the more active in the electrochemical series.

It should be noted that the change of phase between the nitrogen gas phase and the contaminant phase is gradual, not sudden. Thus, generally, the release of nitrogen, although at a maximum at one particular Eh (for a given pH), still occurs, in most cases, over quite a wide range of Eh. Of course, the expert knows that it is not possible to measure Eh voltages of contaminated waters to a high degree of consistency and accuracy, nor is it possible to set the cell voltage all that accurately.

It is recognised herein, however, that the margins of Eh voltage between which an effective release of nitrogen gas will take place are wide enough that the inaccuracies of measurement and adjustment, which are inevitable in practice, can be accommodated.

The designer must see to it that sufficient electrical energy is available in the cell to keep the Eh voltage in the contaminated water at the desired level, i.e between the calculated/indicated limits. The resistance of the water should not be expected to remain constant as treatment takes place, and in fact generally the resistance of the cell may be expected to increase as the contaminant is eliminated. Thus, in order to maintain the required Eh voltage in the water, more energy must be passed through the cell. There may come a point, of course, at which it is no longer practical to maintain voltage between the electrodes: but it is recognised herein that, in general, waters that are contaminated with nitrogenous contaminants are of such a conductivity that the required voltages at the electrodes can be maintained while supplying electrical energy in an economical manner.

In many cases, it is economical to provide automatic control of the voltages, which can be useful in a case where the Eh, pH, concentration of the contaminants, etc might be subject to variation over a period of time.

It may be noted that carbonates, sulphates, chlorides, etc, and the like, may all be present in addition to the nitrogenous contaminants in the water, and all these substances can have an effect on the Eh voltage. However, it is recognised that the single measurement of Eh takes care of all the substances. By contrast, it would be difficult to determine what the Eh voltage should be, by calculation, taking account of the various substances in their various concentrations. But, in most cases, a single measure of the actual value of the Eh of the water is all that is needed: the voltage that must be obtained to transform the nitrogen to nitrogen gas can also be easily determined, e.g by inspection from the nitrogen phase diagram. This makes the system easy to automate: even though the composition of the contaminants may change, as the water passes by, and as a result of the treatment, all that need be done to maintain efficiency is to periodically check the Eh and the pH, and adjust the cell voltage accordingly.

DETAILED DESCRIPTION OF PREFERRED EMBODIMENTS

BRIEF DESCRIPTION OF THE DRAWINGS

By way of further explanation of the invention, exemplary embodiments of the invention will now be described with reference to the accompanying drawings, in which.

The systems shown in the accompanying drawings and described below are examples which embody the invention. It should be noted that the scope of the invention is defined by the accompanying claims, and not necessarily by specific features of exemplary embodiments.

Figure 1:
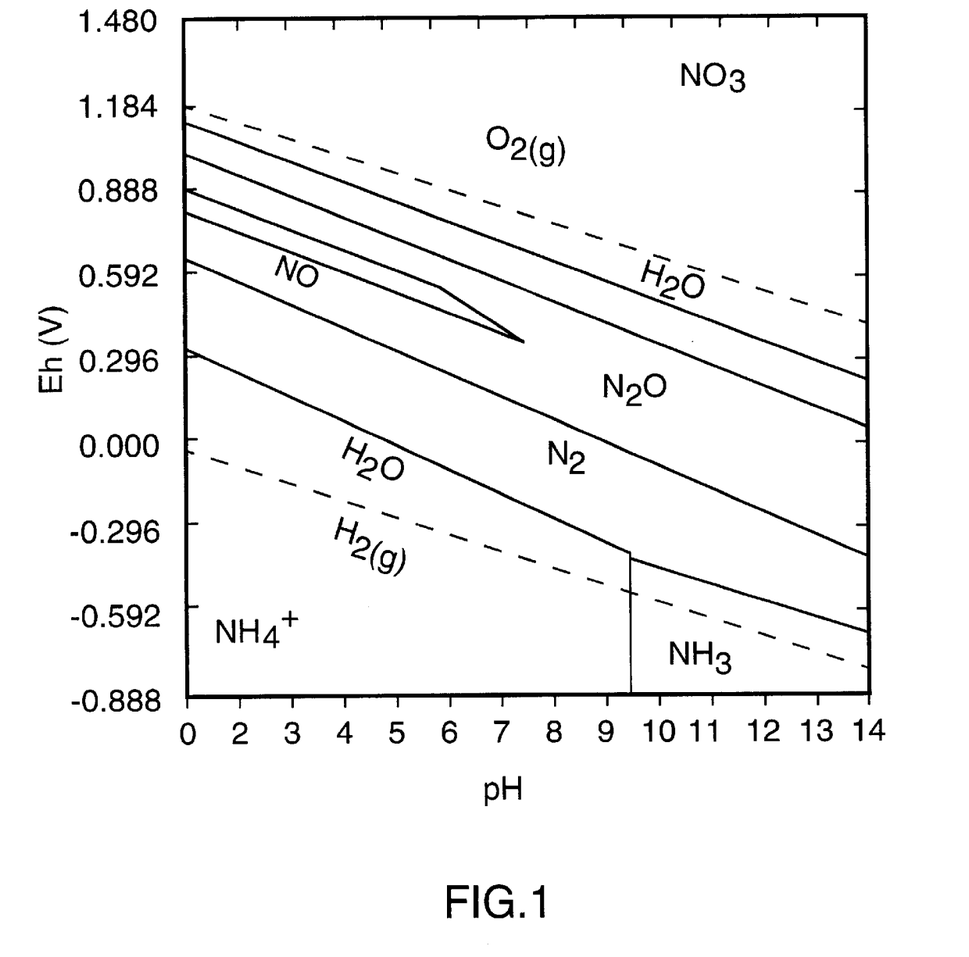
FIG. 1 is an Eh-pH diagram, which indicates the phases of nitrogen under the various conditions.

FIG. 1 is an Eh-pH diagram for aqueous nitrogen species under the conditions stated. Whether the predominant form of the nitrogen in the water is ammonium, ammonia, nitrate, nitrite, or nitrogen gas, may be derived, according to the diagram, by entering the actual conditions of the variables, and reading off the redox voltages. Since it is desired that nitrogen gas be the predominant form, the engineer may read off the redox voltages, for a given pH, between which $N_2$ gas will predominate.

For example, at a pH of 7 the predominance field of nitrogen gas occurs between −250 mV (moderately reducing) and +150 mV (moderately oxidising) at a nitrogen activity of 0.8 atm, oxygen gas activity at 0.2 atm, and the activity of aqueous nitrogen species fixed at $10^{-3}$ moles/liter.

(For the purposes of this specification, the term "activity" is used to indicate the ideal thermodynamic concentration of a chemical species present in the system under consideration. If the species is present as a gas, the activity may be measured as a partial pressure; if the species is present as a non-volatile component, it may be measured in terms of a concentration value, for example moles/liter.)

In applying the invention to the treatment of sewage water, an electrolytic/galvanic cell is set up, in which the sewage water is the electrolyte. The purpose of the cell is to enhance the electrochemical oxidation of ammonium in the sewage water, and the reduction of any residual or generated nitrate in the sewage water, both directly to nitrogen gas, thereby minimising the escape of the toxic nitrogenous gases, and allowing the preferential escape of non-toxic nitrogen gas.

Preferably, a bank of electrochemical cells is provided, each cell having anodic and cathodic compartments connected by a salt bridge or an ion-selective membrane.

Figure 2:
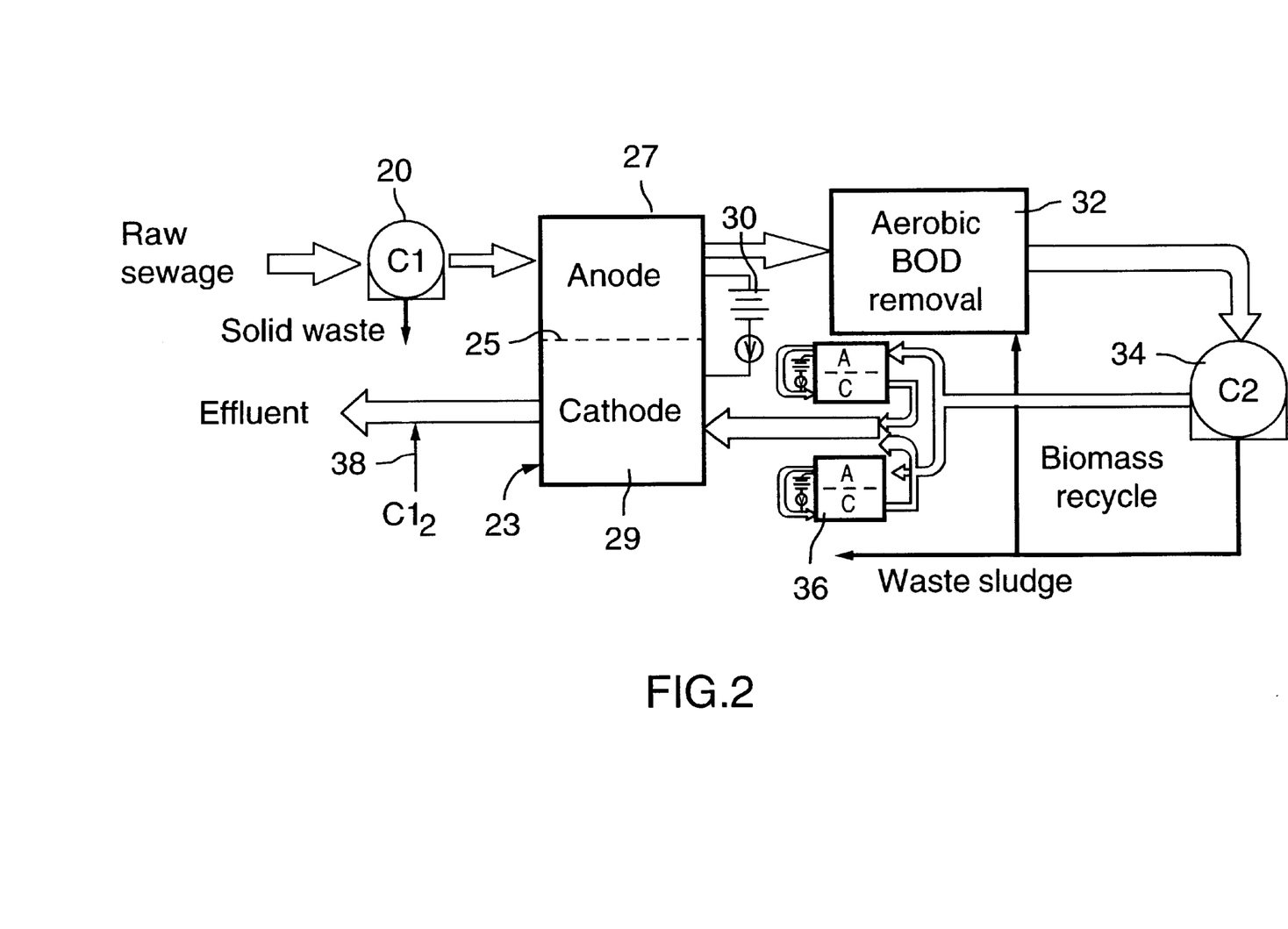
FIG. 2 is a schematic diagram of a municipal sewage treatment installation, which embodies the invention.

FIG. 2 is an example of a water treatment plant. Raw sewage enters the primary clarifier 20, where initial settling of solid material takes place. The water then passes to a cell 23. The cell is divided by an ion-selective membrane 25, the two compartments of the cell being given anode 27 and cathode status by the action of a voltage source 30.

Having passed through the anode 27, in which the ammonium in the sewage water is oxidised and removed, the water passes to the aerobic tank 32, where BOD (Biological Oxygen Demand) is reduced. (The tank 32 is of conventional design, being, for example, a trickling tank, or an activated sludge tank.) Sludge is separated and removed from the water in a settling tank 34. Biomass recycling takes place due to the interaction of the tanks 32 and 34.

Water from the settling tank 34, which contains nitrate, passes to the cathode compartment 29 of the cell 23, where the nitrate is broken down and removed. As shown, the water from the settling tank 34 may first be passed through one or more powered cells 36, which serve to ensure that the breakdown and removal of all the ammonium and nitrate is as complete as possible.

The clean effluent water can be further treated with chlorine, as at 38, if desired.

The electrons released in the anodic compartment 27 by the oxidation of the ammonium are collected by the anode, and pass via external wiring to the cathode 29, there to promote the reduction of residual nitrate to $N_2$ gas. (if nitrate is absent, under anaerobic conditions hydrogen ($H^+$) will probably serve as the electron acceptor, only minor oxygen being present under the existing redox conditions.)

Each cell operates independently of the others and can be isolated when maintenance is required.

So long as the redox voltage is maintained within the indicated limits (FIG. 1) only a single-stage treatment system is required. This treatment cell is arranged to control the redox potential of the solution within the predominance field of nitrogen gas.

Two reactions of interest are:

Nitrogen gas is the most stable phase under typical earth surface conditions (pH 3–10, redox potential −0.5 to +1.2 volts), so the conversion to gas is nearly always thermodynamically favoured. It is recognised herein that, with the nitrogenous contaminants, the conditions needed to transform the contaminant to nitrogen gas are within comparatively easy reach, from which it is recognised that the size of the facility needed to treat the water, residence times, etc, can be engineered on an economical scale.

As to their physical structure, the electrodes of the cell 23 may be of porous graphite, iron, magnetite, etc. The set-up generally requires separate anodic and cathodic compartments, connected via an ion-selective membrane.

The anodic reactions may be described as follows. More than 90% of the nitrogen in sewage water is present as ammonium ($NH_4^+$), and it is the aim to oxidise the ammonium directly to nitrogen gas. The reaction to be encouraged is:

$$2NH_4^+ = N_2 + 8H^+ + 6e-$$

The standard cell voltage, $E_0$ in the Nernst equation, typically would be $-0.28$ V.

The electrolytic cell is used to provide the electrical energy required to initiate this otherwise unfavourable chemical reaction.

The Nernst equation is utilized to evaluate the optimal extent of the electrolytic conversion. The Nernst relationship shows how redox potential of the half-cell changes with concentrations of reactants and products:

$$E = -0.28V + 0.0788 \text{ pH} - 0.0098 \log PN_2 + 0.0197 \log NH_4^+$$

from which it can be seen that E (voltage) becomes more positive by (a) maximising the pH, (b) maximising the $NH_4^+$, and (c) minimising the $p(N_2)$ by withdrawing the nitrogen gas as it is produced.

However, the small coefficients on the various terms in the Nernst equation indicate that the potential should be affected only very slightly by changes in the pH and ammonium content of the influent solution, and by the pressure of nitrogen (in practice, fixed to a value near the atmospheric level of 0.78 atm), The nitrate is broken down in the cathode compartment 29. The cathodic reactions may be described as follows. The intended cathodic reaction is:

$$2NO_3^- + 12H^+ + 10e- = N_2(gas) + 6H_2O$$

The standard cell voltage, $E_0$, would be 1.24 V, whereby this is a spontaneous reaction. The reactions that result in the formation of $N_2O$ and NO are also spontaneous; however, by controlling the voltage within the field of predominance of $N_2$ gas, as described, the formation of the nitrous and nitric oxide species may be inhibited.

The Nernst relationship for the above equation is:

$$E = 1.24 \text{ V} - 0.0709 \text{ pH} - 0.0059 \log PN_2 + 0.0118 \log NO_{3-}$$

It is an aim of the system as described that ammonia/ammonium in sewage water may be broken down, by electrolysis, directly into nitrogen gas. This is contrasted with the conventional biochemical reaction, which has many intermediate stages that can lead to the release of toxic gases.

The invention may be applied in applications other than municipal-scale sewage treatment, as will now be described.

The invention may be used to treat groundwater contaminated with nitrate. The cathodic reaction is as described previously; but the anodic reaction will probably involve the oxidation of water, as follows:

$$2H_2O = O_2 + 4H^+ + 4e- \quad E_0 = -1.23 \text{ V}$$

Generally, treatment of groundwater contaminated with nitrate has been considered very expensive. It is recognised that major cost benefits arise from carrying out electrolysis on groundwater in-situ, as compared with electrolysis treatment systems which involve passing the water to be treated through an engineered treatment facility. Such systems involve the expense of the provision of a means for routing the water to be treated out of the ground, and into and through the facility, and because the facility itself has to be physically large to contain the volumes of water that need to be treated.

In-situ electrolytic treatment of groundwater incurs reduced expense, especially as to capital cost, because the treatment is carried out with the water remaining in the ground, and therefore the cost of engineering a treatment facility, and of engineering a means for moving the water into and out of the facility, is avoided or reduced.

Figure 3:
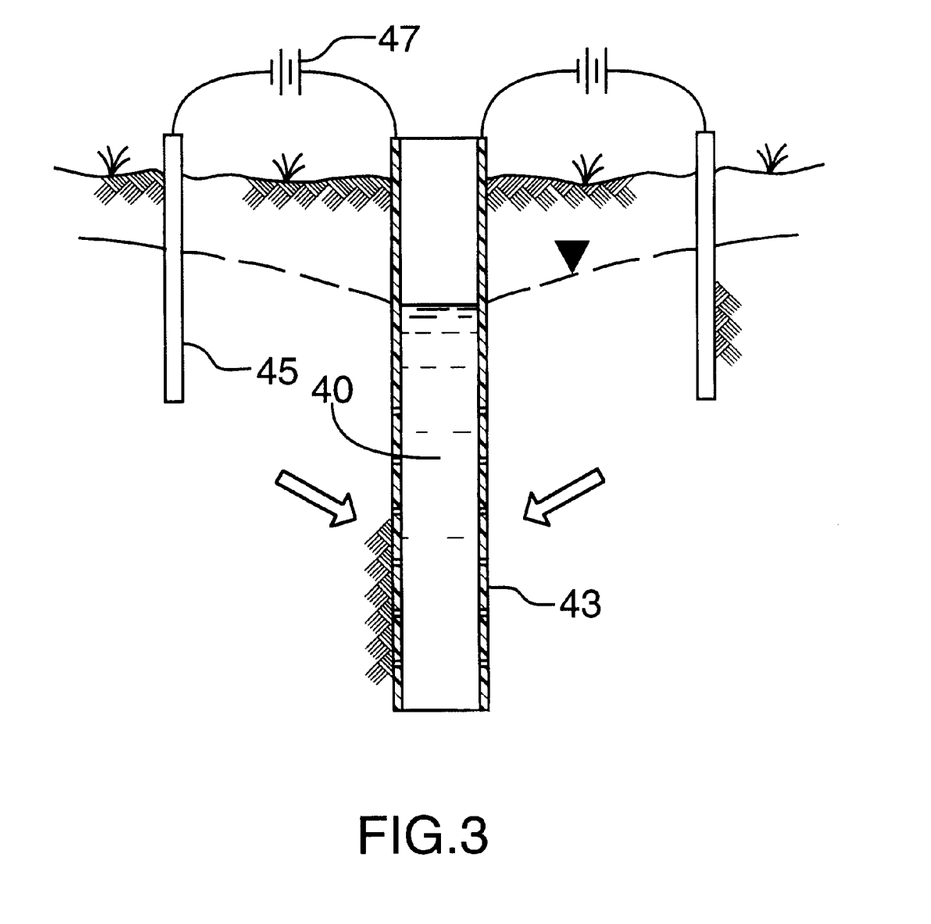
FIG. 3 is a cross-section of an area of contaminated ground around a well, undergoing electrolytic treatment.

FIG. 3 shows a drinking-water well 40, having a metal (steel) casing 43. Nitrate, e.g from agricultural run-off, is contaminating the local groundwater, to the extent of polluting the water drawn up from the well. Carbon rods 45 are inserted into the ground in such a way as to make contact with the nitrate-contaminated water. A voltage source 47 is connected as shown, so as to turn the well-casing 43 into a cathode and the rods 45 into an anode.

The influence of the cathode at the well extends several meters into the surrounding ground, and of course is strongest close to the well. As described, the cathodic reaction serves to reduce or eliminate the nitrate from the water.

Figure 4:
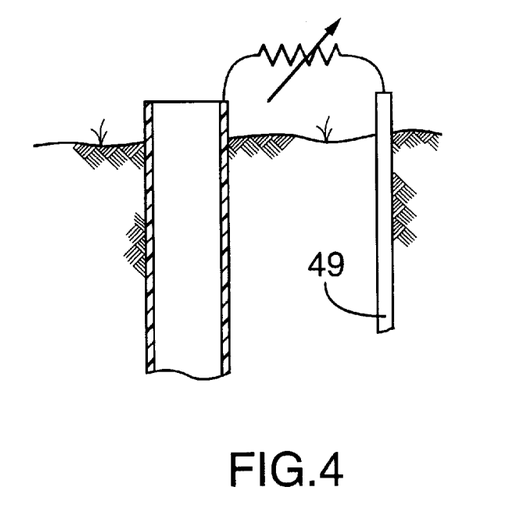
FIG. 4 is a section corresponding to FIG. 3, showing galvanic treatment.

Sometimes, even a galvanic cell (i.e a cell having no source of electrical energy) can create a sufficiently vigorous reduction of the nitrate that the nitrate is treated effectively. FIG. 4 shows the anode 49 in such a case. The anode is of an electro-active metal, such as magnesium.

Figure 5:
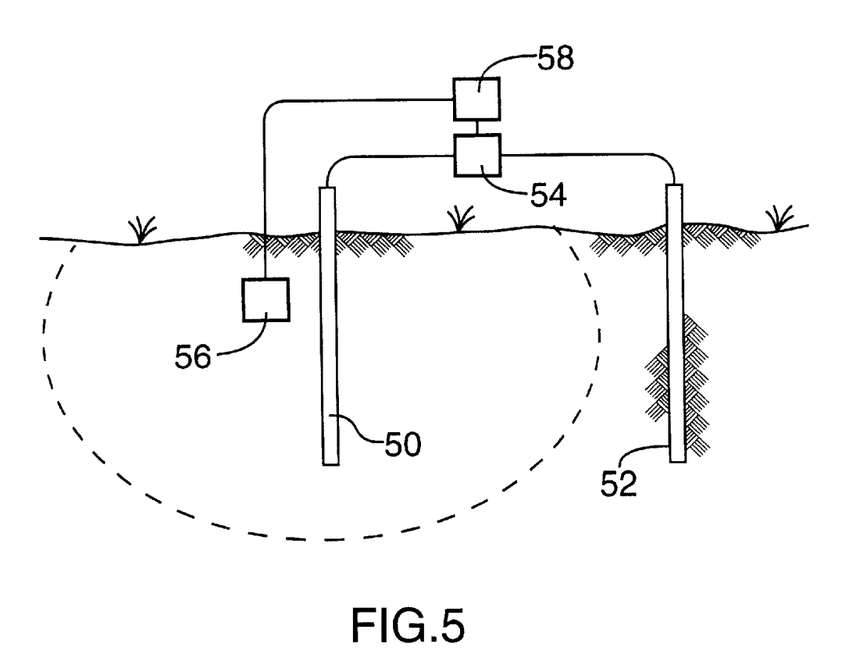
FIG. 5 is a cross-section of an area of contaminated ground, undergoing electrolytic treatment.

FIG. 5 shows a case where nitrate-laden water is to be treated, not at a well as in FIGS. 3 and 4, but while passing through the ground. Two carbon rods 50,52 and a voltage source 54 are so placed that the cathode 50 lies within the area of contaminated groundwater, and the anode 52 lies in the groundwater outside the contaminated area. (The demarcations between contaminated and uncontaminated of course are characterised by gradual, not sharp, changes in concentration of the contaminant.)

As shown in FIG. 5, sensors 56 are provided for monitoring the pH and Eh of the groundwater. Signals from these sensors are processed by a computer 58, and the result fed to the voltage source 54. Thus, if the Eh (or indeed the pH) of the water should change, the voltage is adjusted. Similarly, a check can be kept that the right amount of electrical energy is being supplied to keep the voltage at the desired level. The "before" and "after" measurements can be compared, for checking the efficacy of the treatment system.

Figure 6:
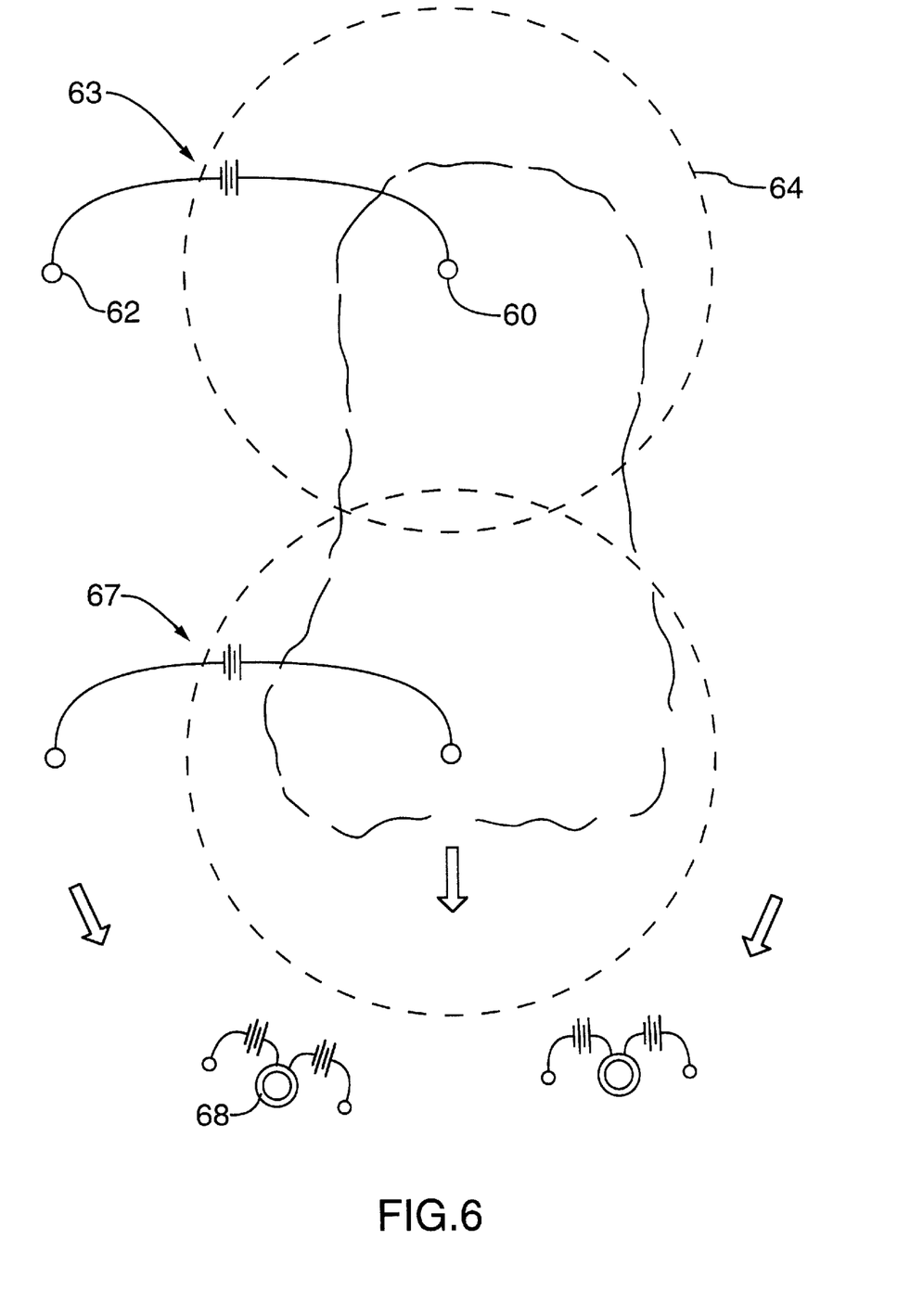
FIG. 6 is a plan view of an area of ground, undergoing treatment of the kind as shown in FIG. 5.

Sometimes, only one cell is needed. If more than one is needed, the extra cells are added in the same manner, ie with the cathode inside the contaminated area and the anode outside. FIG. 6 shows a plan of a typical area of ground in which the groundwater is contaminated with nitrate. Two cells are shown, and other cells may be added later, as the contaminated zone moves, or to give more efficacy to the treatment.

In FIG. 6, two cells are provided. The required voltage is supplied between the cathode 60 and the anode 62 of the first cell 63. The cathode 60 creates an area of influence 64, in which the nitrate is transformed into nitrogen gas. The anode has substantially no effect on the contaminant. The second cell 67 is similar.

In FIG. 6, as shown, the reason treatment is being undertaken is because drinking6 water wells 68 are located in the path of the oncoming plume of nitrate. These wells may be further protected from any nitrate that escaped the cells 63,67. The protection is the same as shown in FIG. 3.

When more cells are added, these can be added as electrically-separate units, or they may be connected in series, or in parallel, with the existing cells. The engineer should make sure the voltage at the electrodes are maintained, and the manner of connection is secondary to that.

The invention is intended for use generally in setting up large scale electrolysis cells, preferably in-situ, with or without added electrical energy. Electrodes may be engineered to be suitable for the needs of the individual case.

The engineer should take account of the effects of electrochemical activity at the anode (in both the electrolytic and the galvanic cases) in that electrolysis of the water at the anode will lead to the generation of hydrogen ions, and an increase in acidity.

If the water is naturally alkaline, a little extra acidity would not matter. However, if the water is naturally acidic, further acidity might be a problem. If so, the engineer might decide to provide the anode in a sacrifical material, whereby acidity generated at the anode would be reduced.

Since the material of the sacrifical anode passes into the water, the material should be selected on the basis of being environmentally friendly in water. Magnesium, for example, has very low toxicity in water, and is a good choice for the sacrifical anode. Aluminum, on the other hand, can be toxic in water, and is contra-indicated. In some cases, for example if the water contains such potentially toxic materials as dissolved aluminum and other metals, the preferred sacrificial anodic material would be iron, because iron can promote co-precipitation of dissolved metals.

Other areas of applicability for the technology are:

Treatment of well water. Many wells are contaminated with nitrate. The electrolytic cell in the well converts nitrate to nitrogen gas.

Treatment of an aquifer contaminated with nitrate, at depth (where there is little biological activity to reduce the nitrate). The electrolytic cell arises by placing electrodes in the aquifer. Electrolysis reduces the nitrate to nitrogen gas.

Treatment of animal waste collection tanks. Here, the waste material is, for example, in a tank under a pig barn. In addition to addressing the ammonium, as described, electrolysis converts hydrogen sulphide to $H^+$ and $SO_4^-$ and converts methane to $H^+$ and $CO_2$.

Treatment of mine waste water. Ammonium nitrate +diesel fuel, as used for explosives, leaves ammonia ($NH_3$) dissolved in the water. Electrolysis converts the ammonia to nitrogen gas.

Treatment of waste water from the food processing industry (e.g pickling plants).

Other points to be considered in relation to the treatment of contaminated water by electrolysis as described herein are:

The efficacy of the electrolysis reaction is generally much less dependent on temperature than biochemical reactions. Biological denitrification at 10° C. may be expected to be an order of magnitude less than at 25° C. The electrolysis reaction can be expected to take place efficiently even in prolonged freezing weather.

The conventional biological treatment produces sludge. The electrolysis reaction can be expected to produce a comparatively smaller amount of sludge.

Electrolysis circumvents the need to add a carbon source, which is needed in conventional biological denitrification for maintaining reaction rate and completion. This may also reduce the volume of sludge produced.

Biochemical reactions typically proceed slowly, whereby long residence times are required for treatment to be completed. The electrolysis reactions can be expected to be completed in shorter periods, thus avoiding the long residence times.

If an electrolysis system is found to be inadequate, often the inadequacy can be remedied simply by adding a further electrolytic treatment facility, in series with the already-present facility. The expense of doing that is hardly more than the expense of providing the larger system originally would have been. By contrast, if a biological system is found to be inadequate, generally it cannot be remedied in that way, i.e simply by adding another small system. Rather, what is required is that the inadequate biochemical system must be removed, and a whole larger system installed in its place. Therefore, the prudent designer of a conventional biochemical system had to take care to make a contingency provision, at the time the system was installed, often at considerable expense, for future increased demands on the system. The designer of the electrolytic system, on the other hand, can engineer the system just for today's needs, knowing that the system can easily be upgraded later if the need should arise.

The term Eh as used herein is defined as follows. The Eh voltage of a solution is the redox potential generated in the solution by comparison with a standard hydrogen electrode. A standard hydrogen electrode comprises a platinum wire with hydrogen bubbling around it, contained within a solution of hydrogen ions in solution of $10°$ moles per liter (the zero pH condition).

What is claimed is:

1. Procedure for in-situ treatment of groundwater contaminated by a nitrogenous contaminant, wherein:

the water is groundwater in its native aquifer in the ground, and the treatment procedure is carried out in-situ, the contaminated water remaining in the aquifer during the procedure;

the procedure includes the following steps:

measuring the pH of the nitrogen-contaminated groundwater;

determining, for that pH as measured, the voltages V-Ngas-upper and V-Ngas-lower, being the limiting Eh voltages between which the predominant nitrogen phase is nitrogen gas;

providing a pair of electrodes in the nitrogen-contaminated-water, in the ground;

so arranging the electrodes in the ground, that the electrodes are in electrolytic communication with each other through the nitrogen-contaminated-water, in the ground:

thereby creating an electrochemical cell in the water, in the ground, being either an electrolytic or a galvanic cell, the nitrogen-contaminated-water comprising the electrolyte of the cell;

measuring the Eh voltage V-Eh of the nitrogen-contaminated-groundwater;

controlling the voltage V-cell, being the voltage as measured between the in-ground electrodes of the in-ground cell, to such a value as to maintain an Eh voltage in the water in the vicinity of one of the electrodes at a voltage V-Ngas, being an Eh voltage between V-Ngas-upper and V-Ngas-lower;

whereby the nitrogenous contaminant in the groundwater is transformed, in-situ, in the ground, into nitrogen gas;

providing means enabling the resulting nitrogen gas to bubble up out of the water and out of the ground;

the Eh voltage of a solution being the redox voltage generated in the solution by comparison with a standard hydrogen electrode.

2. Procedure of claim 1, including the step of maintaining the Eh voltage of the contaminated water substantially halfway between the said voltages V-Ngas-upper and V-Ngas-lower.

3. Procedure of claim 1 including the step of providing a nitrogen-oxygen-hydrogen Eh-pH phase diagram, and of using same to determine the V-Ngas-upper and V-Ngas-lower voltage levels.

4. Procedure of claim 1 including the step of so arranging the cell that the contaminated water comprising the electrolyte of the cell is water that is moving or flowing relative to the electrodes.

5. Procedure of claim 4, including the step of establishing the presence of a body of the contaminated water, of providing a plurality of the cells in the body of contaminated water, and of so arranging the cells that the contaminated water flows from cell to cell.

6. Procedure of claim 1, wherein, in a case where a desired V-Ngas voltage is determined to be lower than V-Eh, whereby electrons need to be added to the contaminant to transform the nitrogen in the contaminant to the gaseous nitrogen phase, the procedure includes the step of ensuring the water moves or flows past the cathode.

7. Procedure of claim 6, wherein the contaminant in the groundwater is nitrate.

8. Procedure of claim 7, wherein the cathode of the cell is a metal casing of a well, and wherein the procedure includes the step of providing the anode in the form of a conductive rod inserted in the material of the aquifer, within a few meters of the well.

9. Procedure of claim 1, wherein the contaminant in the groundwater is nitrate arising from agricultural run-off.

10. Procedure of claim 1, including the step of so arranging the electrolytic cell that the treatment procedure is carried out at a depth in the ground below that at which biological denitrification takes place.

11. Procedure of claim 1, including the step of ensuring, by on-site measurement, a sufficient size of the cell and the electrodes, and of ensuring a sufficient residence time of the water in the vicinity of the electrodes, as to ensure effective transformation of the nitrogenous contaminant to nitrogen gas.

12. Procedure of claim 1, including the step of providing a voltage control means, which is effective to increase or decrease the electrical energy supplied to the electrodes, for maintaining the voltage V-cell between the electrodes at the said level.

13. Procedure of claim 12, including the steps of:
monitoring the pH and Eh of the contaminated water, and computing a consequently-required level of the voltage V-Ngas, on an on-going basis;
providing a voltage control means, which is responsive to the said consequently-required level of the voltage V-Ngas, and is effective to increase or decrease the electrical energy supplied to the electrodes, for maintaining the voltage V-cell between the electrodes at the consequently-required level.

14. Procedure of claim 1, wherein the material of the anode is sacrificial, in that the material of the anode is of the kind that passes into solution in the water as a result of electrochemical activity.

15. Procedure of claim 14, wherein the contaminated water is acidic.

16. Procedure of claim 14, wherein the material of the anode is, or includes, magnesium.

17. Procedure of claim 14, wherein the contaminated water contains a dissolved metal, and the material of the anode is, or includes, iron.

18. Procedure of claim 1, including the step of applying and maintaining electrical energy from an outside source between the pair of electrodes, of such magnitude as to maintain the said voltage V-cell between the electrodes.

19. Procedure of claim 1, including the step of, by use of the Nernst equation, determining a level V-Ngas of the Eh voltage that will produce a transformation of the contaminant into gaseous nitrogen by that reaction.

* * * * *